United States Patent [19]

Chapman

[11] Patent Number: 4,892,584
[45] Date of Patent: Jan. 9, 1990

[54] WATER SOLUBLE INFRARED ABSORBING DYES AND INK-JET INKS CONTAINING THEM

[75] Inventor: Derek D. Chapman, Rochester, N.Y.

[73] Assignee: Eastman Kodak Company, Rochester, N.Y.

[21] Appl. No.: 279,752

[22] Filed: Dec. 5, 1988

[51] Int. Cl.$^4$ .................. C09D 11/02; C09B 45/32
[52] U.S. Cl. ........................... 106/22; 534/703; 534/707; 534/710; 534/620; 8/686; 8/674
[58] Field of Search ............... 106/22; 534/703, 707, 534/710, 620, 674, 685, 686

[56] References Cited

U.S. PATENT DOCUMENTS

| | | | |
|---|---|---|---|
| 3,994,736 | 11/1976 | Hertz et al. | 106/22 |
| 4,357,411 | 11/1982 | Kalenda | 430/223 |
| 4,368,153 | 1/1983 | Kalenda | 534/707 |
| 4,368,248 | 1/1983 | Kalenda | 534/707 |

Primary Examiner—Paul Lieberman
Assistant Examiner—Helene Klemanski
Attorney, Agent, or Firm—Joshua G. Levitt

[57] ABSTRACT

Novel metallized azo dyes are useful as infrared absorptive dyes in inks for ink-jet printing.

10 Claims, No Drawings

WATER SOLUBLE INFRARED ABSORBING DYES AND INK-JET INKS CONTAINING THEM

This invention relates to novel metallized azo dyes that absorb in the infrared region of the spectrum and to ink-jet printing inks containing these dyes.

In ink-jet printing a liquid ink is forced through a very small diameter nozzle in a manner to form a stream of essentially uniform sized spherical droplets. In continuous ink-jet printers a continuous stream of uniformly-spaced droplets is formed and directed either towards a location where an image is to be formed or towards a sump, depending upon an applied signal. In drop-on-demand ink-jet printers a droplet of ink is ejected only when needed to form an image.

Ink-jet printing has found widespread use in a number of applications. One of these is the application of bar codes for use with laser scanner devices. Since a significant number of laser scanners are sensitive to infrared radiation, infrared absorptive inks are necessary for such an application.

Hertz U.S. Pat. No. 3,994,736, issued Nov. 30, 1976, describes ink-jet inks containing premetallized azo dyes. Typical dyes are described as being chromium or copper complexes. Ferrous complexes are not described, nor are the representative dyes described as having significant absorption in the infrared region of the spectrum.

Kalenda U.S. Pat. No. 4,357,411, issued Nov. 2, 1982, describes image transfer dye-releasing compounds which release a black pyridylazo dye. Neither the compounds nor the released dyes are described as having significant absorption in the infrared region of the spectrum, nor are they described as being useful in ink-jet inks.

The present invention provides novel, water-soluble, ferrous chelate, infrared-absorptive azo dyes having the structure:

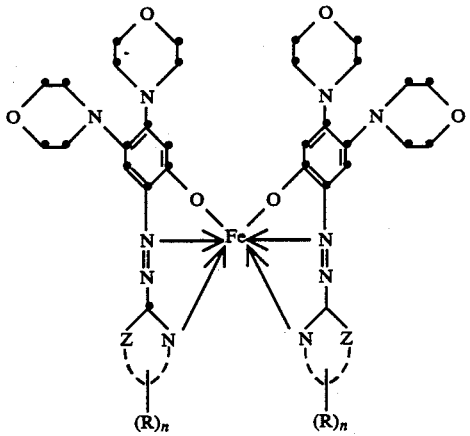

wherein
n is 1 to 3;
Z represents the atoms to complete a nitrogen containing, aromatic heterocyclic group, and
R represents at least one water solubilizing group.

The heterocyclic groups completed by Z can be the same or different and include pyridyl, pyrazyl, benzothiazolyl ad benzodiazolyl groups. Preferred are pyridyl and benzodiazolyl.

The substituents represented by R comprise at least one water-solubilizing group on each of the heterocyclic groups completed by Z.

Preferred water-solubilizing groups are carboxy and sulfo, or groups terminated with such groups such as carboxyalkyl, sulfoalkyl, and carboxyalkylsulfonyl.

Optional other substituents on either or both of the heterocycles, if any, should be innocous substituents such as halogen, e.g. chloro, lower alkoxy of 1 to 4 carbon atoms, e.g. methoxy, ethoxy, propoxy, and lower alkyl of 1 to 4 carbon atoms, e.g. methyl, ethyl, and propyl. Any such substituent should not react with other components of the ink, nor significantly reduce the solubility of the dye.

Representative dyes have the following structures:

TABLE I (as ferrous chelate)

| Dye | J |
|---|---|
| 1 | Cl-pyridyl-SO₂NHCH₂CO₂H |
| 2 | Cl-pyridyl-SO₂NH(CH₂)₂SO₃Na |
| 3 | pyridyl-CO₂H |
| 4 | benzothiazolyl-SO₃Na |
| 5 | Cl-pyridyl-CO₂H |
| 6 | pyrazyl-benzyl-COOH (mixture of the 6 & 7 isomers) |

Each of these dyes has appreciable absorption in the infrared region of the spectrum.

Dyes of this invention can be prepared by generating the unmetallized azo compound by the interaction of a nitrogen heterocycle, containing a hydrazine at a position adjacent to a ring nitrogen, with 4,5-dimorpholino-o-benzoquinone. A dimethylformamide solution of the azo dye is then treated with ferrous chloride to form the 2:1 dye/$Fe^{2+}$ complex.

A specific representative synthesis of a dye of this invention is illustrated by the following example. In this example the analytical data obtained was consistent with theory and the spectral values were satisfactory.

SYNTHESIS EXAMPLE 1

Synthesis of Dye 1

Intermediate 1A: (4,5-dimorpholino-o-benzoquinone)

This compound was prepared by the method of Brackman and Havinga, Rec. Trav. Chim. Pays-bas 74, 937 (1955).

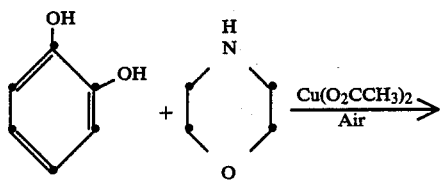

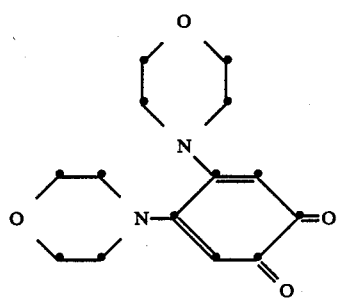

Pyrocatechol (99.0 g; 0.9 mole) was dissolved in methanol (2.5 l), then morpholine (360 ml; 4.1 mole) and cupric acetate (9.0 g) were added. Air was bubbled through the reaction solution for about 9 hours. The mixture was cooled and filtered; the solid was washed with methanol (1.5 l) and air dried. The yield was 150.3 g (60%).

Intermediate 1B: 2,3-dichloro-5-(N-carboxymethylsulfamoyl) pyridine

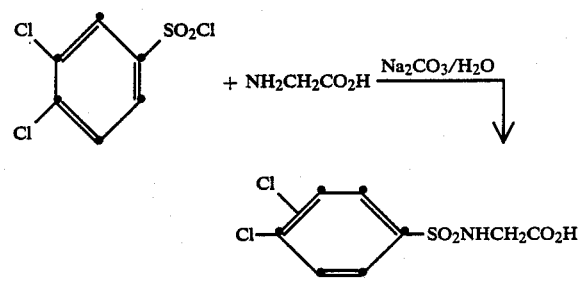

Glycine (120.0 g; 1.6 mole) was dissolved in a solution of sodium carbonate (170.0 g) and water (750 ml) and cooled. Sulfonyl chloride (100.0 g; 0.4 mole) dissolved in ether (100 ml) was added dropwise with stirring. The mixture was stirred at ice bath temperature for 5 hours and then overnight at room temperature. The reaction mixture was diluted with water, the layers were separated, and the aqueous layer was acidified with hydrochloric acid, and filtered. The yield was 98.4 (85%).

Intermediate 1C: 3-chloro-2-hydrazino-5-(N-carboxymethylsulfamoyl)-pyridine

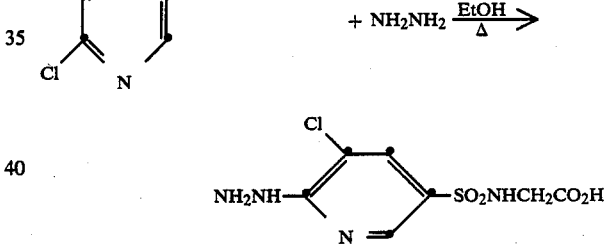

The chlorointermediate, 1B, (98.0 g, 0.34 mole) was dissolved in ethanol (1.0 l), and hydrazine (34.3 ml; 1.1 mole) was added. The mixture was refluxed for 24 hours, cooled, and filtered. The solid was dissolved in 10% sodium hydroxide (1.5 l), neutralized, and filtered. The yield of crude material was 95.0 g.

Unchelated azo dye, 1,2-[3-Chloro-5-(N-carboxymethylsulfamoyl)-2-pyridylazo]-4,5-dimorpholino phenol

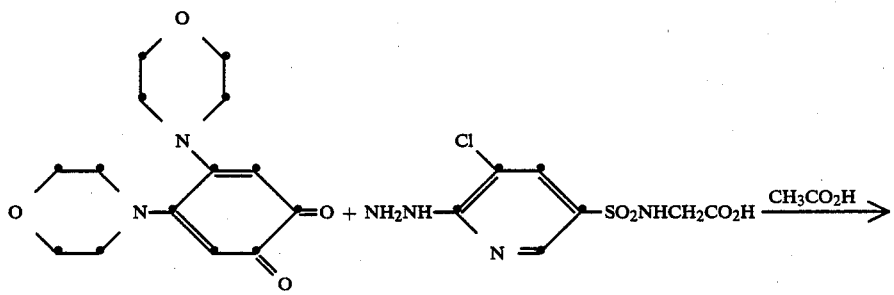

-continued

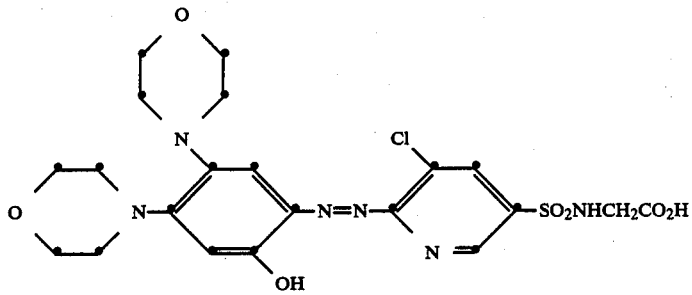

The hydrazine intermediate, 1C, (60.4 g; 0.21 mole) was dissolved in acetic acid (900 ml). The quinone intermediate, 1A, (60.0 g; 0.21 mole) was added and the mixture was stirred at room temperature overnight. The reaction mixture was filtered and the solid was oven dried. The yield was 48.6 g (42%).

Ferrous chelate dye 1

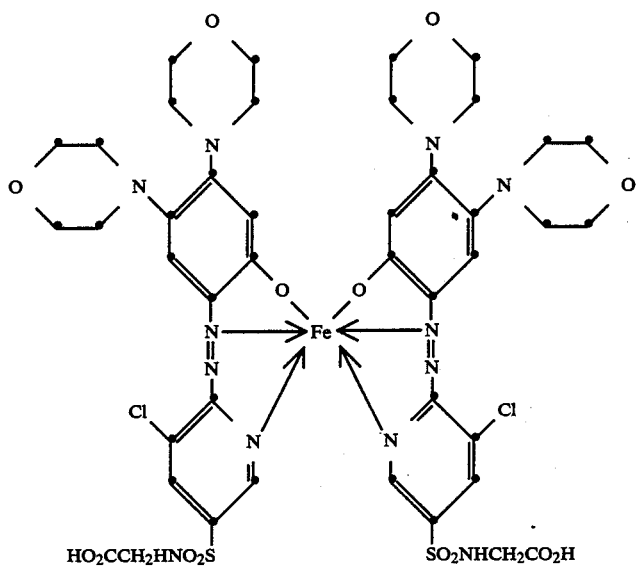

the unchelated azo dye 1 (80.0 g; 0.15 mole) was dissolved in dimethylformamide (500 ml) and a slight excess of ferrous chloride tetrahydrate (15 g) was slowly added. The formation of the chelate was followed by thin-layer chromatography on silica-gel using pyridine/butylacetate/water (2/2/1) as solvent.

The product was isolated by drowning out in a large volume of water followed by filtration. The solid was slurried in ethanol, filtered and oven dried. Yield 85.0 g.

Ink-jet compositions containing dyes of this invention comprise an aqueous solution of the dye.

Since infrared absorptivity is the principal reason for incorporating the dyes, the dye need not have significant absorption in other regions of the spectrum, nor need there be other dyes present. However, dyes of the present invention absorb across a broad region of the spectrum and may appear black. In addition, there can be incorporated other dyes to further enhance the neutral appearance of the ink. Such dyes include Direct Black dyes such as the following:

| | |
|---|---|
| DB-4 | Direct Black Rx 125% from Fabricolor Inc. P.O. Box 2398, Paterson, N.J. 07509 |
| DB-19 | Pergasol Black G 200%; |
| DB-22 | Diphenyl Black FG and |
| DB-38 | Direct Black E 200% all from Ciba-Geigy Corp. |
| DB-168 | P.O. Box 18300, Greensboro, N.C. 27419 Coriacide Black SB from ICI Americas Inc. Concord Pike and Murphy Rd., Wilmington, Del. 19897 |

The ink of this invention must possess two seemingly diametrically opposed characteristics—that of not drying in the nozle, which causes clogging and plugging if the nozzle is not washed out after each use, and that of being able to set up and dry rapidly upon being deposited upon the printing surface, e.g., a piece of paper. The first of these characteristics can be imparted by the presence of an aliphatic polyhydric alcohol or a derivative thereof, and the second by a lower-aliphatic monohydric alochol component. Since washing of the nozzle after each use is usually not a desirable procedure it is normally preferable that the polyhydric alcohol component be present.

As used hereinafter the term aliphatic polyhydric alcohol refers to straight chain aliphatic compounds having two or more hydroxyl groups. Exemplary of such polyhydric alcohols are glycerol (1,2,3-propanetriol, boiling point 290° C.), propylene glycol (1,2-propanediol, boiling point 189° C.) and ethylene glycol (1,2-ethanediol, boiling point 198° C.). The higher boiling point glycerol is preferred. Derivatives of the polyhydric alcohols such as the polyglycols may also be used.

As used hereinafter the term "lower-aliphatic" alcohols designate those monohydric alcohols having one hydroxyl group and up to and including 5 carbon atoms in a straight or branched chain. The monohydric alcohol component may be a mixture of lower-aliphatic alcohols, a preferred mixture being about 30% by weight of ethyl alcohol and 70% by weight of n-propyl alcohol.

Due to the polar nature of the alcohol components, the ink of this invention has a certain inherent degree of electrical conductivity. However, in ink-jet printing systems where the operation of the system depends upon the ink being charged electrically, it will generally be preferable to add a small amount of an ionizable inorganic salt formed of a chloride or nitrate anion and an alkali metal cation, a term used hereinafter to include ammonium ion.

The viscosity of the ink when used in an ink-jet printing system should not be greater than about ten times that of water, i.e., it should not be greater than about 10 centipoises at 20° C. It is preferable that the viscosity of the ink be between 1 and 5 centipoises at 20° C.

Other optional components include a wetting agent such as butyl carbitol, a dissolving agent such as N-methyl 2-pyrrolidine, and a biocide such as sodium 2-pyridine-thiol-1-oxide.

A preferred composition would have the following components in the ranges indicated.

| | |
|---|---|
| 1-6% by wt. of | a dye of this invention |
| 1-4% by wt. of | a water soluble black dye |
| 1-3% by wt. of | polyethylene glycol |
| 0-1% by wt. of | butyl carbitol |
| 0-3% by wt. of | N—methyl-2-pyrrolidone |
| 0-0.1% by wt. of | sodium 2-pyridine thiol-1-oxide |
| 1-2% by wt. of | 10 N solution of sodium hydroxide |
| balance | water |

The following example further illustrates the use of a dye of this invention and an ink-jet composition.

EXAMPLE

To a basic ink formulation, having the preferred composition shown above, was added at varying levels between 3.0 and 6.0 weight percent, infrared absorbing dye 6 from Table I, above.

The spectral reflectance of the resulting formulation was measured with a Macbeth PCM 11 spectrophotometer, D filter (900 nm narrow band). The results are shown below:

| Wt. Percent | PCS |
|---|---|
| 3.0 | 0.70 |
| 3.6 | 0.68-0.74 |
| 4.6 | 0.73 |
| 5.0 | 0 73 |
| 6.0 | 0.74-0.76 | where PCS =

$$\frac{\text{Reflectance of the Background} - \text{Reflectance of the Ink}}{\text{Reflectance of the Background}}$$

These values indicate that the ink provides an infrared absorptive image at all concentrations and meets the AIAG Code 39 specification at the 6% level.

The formulation with 6.0 wt. percent infrared absorbing compound was prefiltered to remove extraneous material. It was then found to pass readily through a 0.45 micron absolute filter.

A sample of this formulation was aged at 70° C. for 3 days after which it was evaluated for filterability. There was essentially no change in the filterability of the formulation after aging.

The spectral absorption characteristics of the aged material were measured as described above. The PCS value was found to be 0.68-0.71. This indicates that there was very little degradation of the formulation, especially of the infrared absorptive compound.

This ink formulation was placed in a print head and then used in a Hewlett Packard Desk Jet printer to print characters and solid areas.

A solid fill pattern printed with this ink on the felt side of a sheet of Xerox 4024 DP paper had an optical density of 1.2. The spectral absorption, when measured as described above had a PCS value of 0.77-0.84.

The above evaluation indicates that the infrared absorptive compound tested, and similar materials as described in this patent application, are useful in inks for printing with ink jet prints.

The invention has been described with reference to preferred embodiments thereof. However, it will be realized that modifications and variations can be made within the spirit and scope of the invention.

What is claimed is:

1. A water-soluble, ferrous-chelate, infrared absorptive dye having the structure:

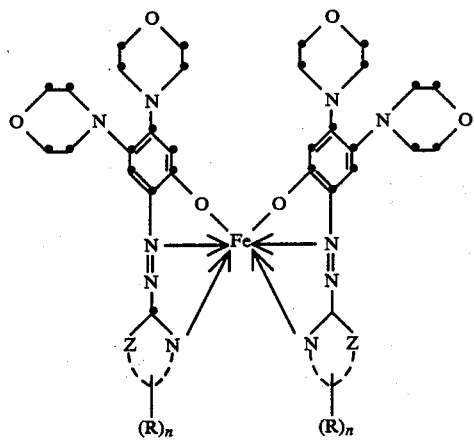

wherein
n is 1 to 3;
Z represents the atoms to complete a nitrogen containing, aromatic heterocyclic group, and
R represents at least one water solubilizing group.

2. A dye of claim 1 wherein Z completes a heterocyclic group selected from the group consisting of pyridyl, pyrazyl, benzothiazolyl and benzodiazolyl.

3. A dye of claim 1, wherein Z completes a benzodiazolyl group.

4. A dye of any one of claims 1 through 3 wherein n is 1 and R is sulfo, carboxy, or a group containing a terminal sulfo or carboxy group.

5. A dye of claim 4 wherein R is a carboxy group.

6. A dye of any one of claims 1 through 5 wherein the heterocyclic group completed by Z contains an innocuous substituent selected from halogen, lower alkoxy and lower alkyl.

7. A ferrous complex of a dye selected from those having the following structures:

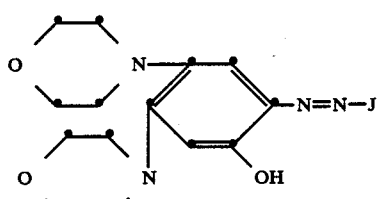

wherein J is selected from the group consisting of

J

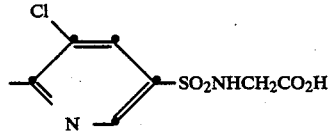

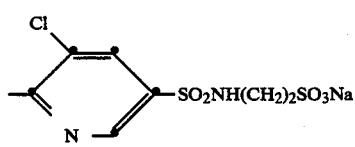

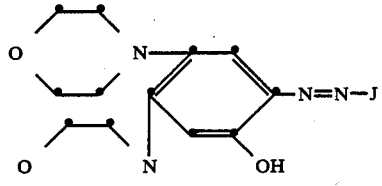

wherein J is selected from the group consisting of

J

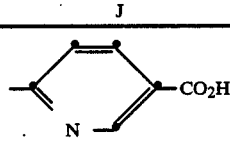

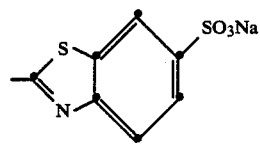

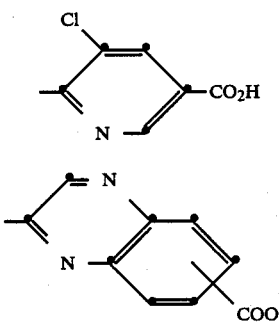

(mixture of the 6 & 7 isomers)

8. An ink jet comprising an aqueous solution of a dye of any one of claims 1–7.

9. An ink of claim 8 further comprising a water soluble black dye, and a polyalkylene glycol.

10. An ink of claim 9 comprising the following components:

| | |
|---|---|
| 1–6% by wt. of | a dye of claims 1–7 |
| 1–4% by wt. of | a water soluble black dye |
| 1–3% by wt. of | polyethylene glycol |
| 0–1% by wt. of | butyl carbitol |
| 0–3% by wt. of | N—methyl-2-pyrrolidone |
| 0–0.1% by wt. of | sodium 2-pyridine thiol-1-oxide |
| 1–2% by wt. of | 10 N solution sodium hydroxide |
| balance | water |

* * * * *

UNITED STATES PATENT AND TRADEMARK OFFICE
CERTIFICATE OF CORRECTION

PATENT NO. : 4,892,584

DATED : January 9, 1990

INVENTOR(S) : Derek D. Chapman

It is certified that error appears in the above-identified patent and that said Letters Patent is hereby corrected as shown below:

Column 10, delete lines 1-13.

Signed and Sealed this

Sixth Day of August, 1991

*Attest:*

HARRY F. MANBECK, JR.

*Attesting Officer*  *Commissioner of Patents and Trademarks*